(12) United States Patent
Arnett et al.

(10) Patent No.: US 6,288,858 B1
(45) Date of Patent: Sep. 11, 2001

(54) METHOD FOR IMPROVING MAGNETIC RECORDING AT HIGH DATA RATES FOR WAVEFORMS HAVING A BURST OF TRANSITIONS

(75) Inventors: Patrick Clinton Arnett, Morgan Hill; David Cheekit Cheng, Palo Alto; Radley Wahl Olson, Cupertino, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,291

(22) Filed: Jun. 9, 1999

(51) Int. Cl.[7] ........................................................ G11B 5/09
(52) U.S. Cl. ................................................................ 360/45
(58) Field of Search ................................. 360/45, 51, 40

(56) References Cited

U.S. PATENT DOCUMENTS

| | | | |
|---|---|---|---|
| 5,025,327 | 6/1991 | Stamness et al. | 360/45 |
| 5,325,241 | 6/1994 | Mattison et al. | 360/45 |
| 5,335,118 | 8/1994 | Meyer | 360/51 |
| 5,357,520 | 10/1994 | Arnett et al. | 714/719 |
| 5,493,454 | 2/1996 | Ziperovich et al. | 360/45 |
| 5,583,705 | 12/1996 | Ziperovich et al. | 360/65 |
| 5,598,364 | 1/1997 | McCall et al. | 360/51 |
| 5,949,357 | * 9/1999 | Fitzpatrick et al. | 341/59 |

FOREIGN PATENT DOCUMENTS 0 653 754 A2   5/1995   (EP) .

OTHER PUBLICATIONS

Xiadong Che, "Nonlinearity measurements and write precompensation studies for a PRML Recording Chanel," vol. 31, No. 6, Nov. 1995, pp. 3021–3026.

C. M. Melas, IBM Technical Disclosure Bulletin, "Write Precompensation for Peak Detection of Partial Response Signals," vol. 37, No. 04A, Apr. 1994, p. 557.

C. J. Goetschel, R. A. Kertis, R. A. Philpott, R. A. Richetta, T. J. Schmerbeck, D. J. Schulte, and D. P. Swart, IBM Technical Disclosure Bulletin, "Programmable Delay Line,", vol. 37, No. 03, Mar. 1994, pp. 53–55.

* cited by examiner

*Primary Examiner*—Regina Y. Neal
(74) *Attorney, Agent, or Firm*—Thomas R. Berthold, E; Banner & Witcoff, LTD (57) ABSTRACT

A method and a device for write precompensating a data pattern for recording the pattern on a magnetic storage medium at high data rates. A first predetermined write-precompensation delay is applied to the second transition of a burst of transitions of the data pattern. A second predetermined write-precompensation delay is applied to the last transition of a burst. A third predetermined write-precompensation delay is applied to the middle transitions, if any, of a burst. When the burst is a dibit, the application of the second and third predetermined write-precompensation delays is omitted and the first predetermined write-precompensation delay is based on the burst being a dibit. When the burst is a tribit, the application of the second predetermined write-precompensation delay is omitted and the first and third predetermined write-precompensation delays are based on the burst being a tribit. A fourth predetermined write-precompensation delay is applied to the transitions in the data pattern that are not part of a burst of transitions.

38 Claims, 3 Drawing Sheets

METHOD FOR IMPROVING MAGNETIC RECORDING AT HIGH DATA RATES FOR WAVEFORMS HAVING A BURST OF TRANSITIONS

BACKGROUND OF THE INVENTION

1. Field of the Invention

The present invention relates to the field of data storage. More particularly, the present invention relates to a method and a device for write-precompensating transitions written to a magnetic storage medium at high data rates.

2. Description of the Related Art

Figure 1:
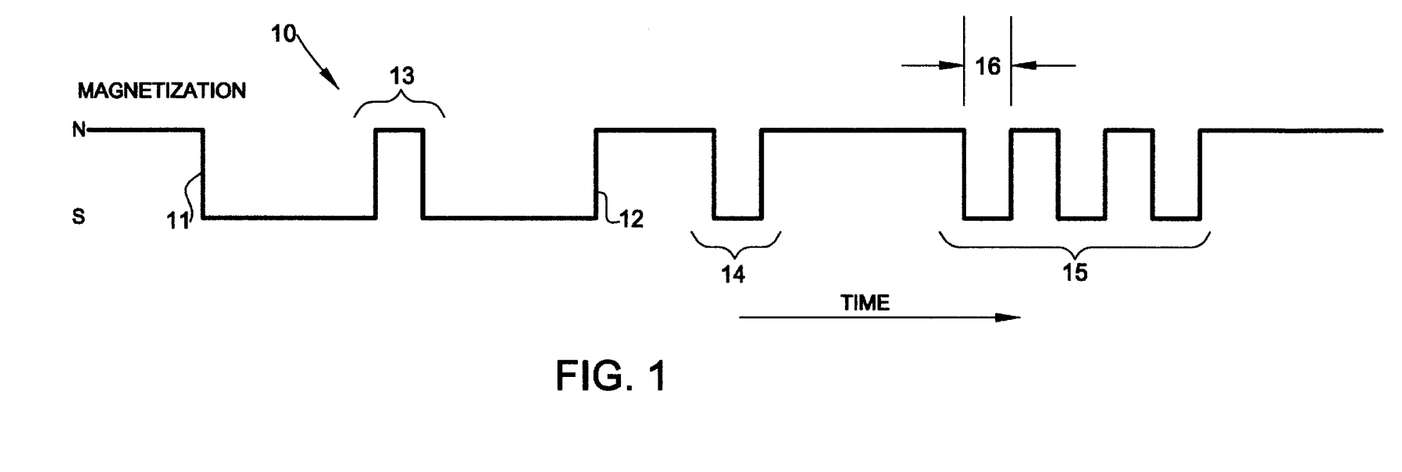
FIG. 1 shows an exemplary write-magnetization pattern.

FIG. 1 shows an exemplary uncompensated non-return-to-zero (NRZ) write-magnetization pattern 10. FIG. 1 shows two exemplary transitions 11 and 12 that are each more than one write-clock period 16 from another transition, and are each referred to as an isolated transition. Two closest-spaced transitions, preceded and followed by one or more write docks without a transition, are referred to as a dibit. FIG. 1 shows two exemplary dibits 13 and 14. Similarly, three closest-spaced transitions are referred to as a tribit, four closest-spaced transitions form a tetrabit, and so on. FIG. 1 also shows a group of transitions 15 that is generally referred to as a burst. A dibit is a two-transition burst, a tribit is a three-transition burst, etc. The transitions in a burst of length n will be assumed to be numbered 1 through n, sequentially.

Several different detection schemes can be used for reading back magnetically recorded data, such as a PRML (Partial Response Maximum-Likelihood) scheme. For PR readback schemes, a single isolated transition (11, 12 in FIG. 1) on readback gives rise to a detected signal that is more that one clock period wide. For PR readback, the readback signal is shaped by filtering and equalization so that when the readback signal is sampled at the readback clock rate, which is the same rate as the write clock rate, an isolated transition ideally gives rise to two equal nonzero sample values that are separated by one read-clock period and with all other samples being zero, e.g., $\pm( \ldots 0\ 0\ 1\ 1\ 0\ 0 \ldots )$.

The readback signals from adjacently-written transitions purposely overlap so that the two successive transitions of a dibit should ideally have a readback pattern of $\pm( \ldots 0\ 0\ 1\ 0\ -1\ 0\ 0 \ldots )$. This readback pattern is the sum of the ideal readback patterns for two isolated transitions in which the second isolated transition is delayed in time by one clock period and its polarity is opposite that of the preceding transition. For PR, a burst of n transitions should ideally have a readback pattern of $\ldots 0\ 1\ 0\pm1\ 0 \ldots 0\pm1\ 0\ 0 \ldots$, with n−1 zero samples between the two nonzero samples. The signs of the two nonzero samples are opposite when n is even. A dibit is thus a special case of a short burst having only one zero sample between the two nonzero samples.

Two other common detection schemes used for reading back magnetically recorded data are EPR (Extended PR) and $E^2PR$ Extended Extended PR). For EPR, an isolated transition gives rise to an ideal equalized readback signal with three successive nonzero samples, $\pm( \ldots 0\ 0\ 1\ 2\ 1\ 0\ 0 \ldots )$. For EPR, a burst of n transitions ideally produces a readback pattern having two equal nonzero samples $\pm(1\ 1)$, followed by n−2 zero samples, followed in turn by two equal nonzero samples $\pm(1\ 1)$. An isolated transition for $E^2PR$ gives rise to four nonzero samples, $\pm( \ldots 0\ 0\ 1\ 3\ 3\ 1\ 0\ 0 \ldots )$, for an ideal equalized readback pattern. For $E^2R$, a burst of n transitions should ideally produce three nonzero samples $\pm(1\ 2\ 1)$, followed by n−3 zero samples, followed by three nonzero samples $\pm(1\ 2\ 1)$. For $E^2R$, a dibit is a special case, producing the pattern $\pm( \ldots 0\ 0\ 1\ 2\ 0\ -2\ -1\ 0\ 0 \ldots )$. For all these detection methods, the sign of the trailing nonzero samples of a burst is opposite that of the leading nonzero samples if n is even.

Write precompensation, that is, the shifting of write pulses in time with respect to the write clock, has long been used in magnetic recording to improve recording performance. For example, in both peak-detection and PR channels, precompensation is used to compensate for intersymbol interference (ISI) and nonlinear transitions shift (NLTS) effects. An NLTS effect occurs when the demagnetization fields from just-written transitions combine with the magnetic field of the write head to cause a transition being written to be shifted from its intended location on the magnetic medium. Write precompensation counteracts the NLTS so the transition is written at its intended location.

In conventional write precompensation for recording high-density transitions, the amount of precompensation used for a transition is determined by the distance of the transition from prior transitions. That is, conventional precompensation techniques compensate for head field interactions with fields from the pattern of magnetic transitions on the disk. Only transitions a short distance from a transition being written typically affect the amount of write precompensation needed because the strength of the interaction (with the demagnetization field from the previously written transitions) decreases very rapidly with distance. The amount of NLTS precompensation needed depends only on the physical distance(s) to the preceding transition(s) on the disk, with precompensation values being a constant fraction of the write clock for a given density of transitions on the disk. In this regard, conventional precompensation techniques are used to set the delay(s) of the second and subsequent transitions of a burst with respect to the write clock. At today's recording densities, NLTS precompensation is typically applied to a transition being written only if another transition was written on the immediately preceding write clock (first-order NLTS precompensation). For this reason, only the second and subsequent transitions of bursts in a data pattern wold have NLTS precompensation applied and the precompensation delay is the same for al such transitions. The amount of this precompensation is termed $\epsilon_1$. At higher densities, a transition being written would be affected by the demagnetization field from transitions written up to two write clocks earlier. The magnitude of the transition shift from a transition occurring two clocks earlier is termed $\epsilon_2$ and is much smaller than $\epsilon_1$ because the distance is doubled. If a transition being written is preceded only by a transition written two clocks earlier, with no transition written one clock earlier, the transition shift is $\epsilon_2$. If a transition being written is preceded by transitions written on both preceding write clocks, the transition shift is $\epsilon_1 - \epsilon_2$, with the minus sign being necessary because the transition written two clocks earlier is of the same polarity as the transition being written. Second-order write precompensation is used to adjust for NLTSs due to transitions written up to two write clocks earlier.

For magnetic recording at high data rates, difficulties arise when writing closest-spaced transitions, that is, transitions separated by only one write-clock tick or period. As the data rate increases, shifts in transitions occur that are caused only by high-data-rate writing effects. High-data-rate writing, as used herein, is defined to be the recording or writing of transitions on a disk when the period of the write clock used for recording is comparable to or shorter than time-dependent phenomena occurring in the write path, that is, the write channel, the arm electronics, the head, the disk, and all associated wiring. In other words, high-data-rate writing is the process in which the time needed for reaching writing conditions, whether caused by the head, the disk and/or the driving electronics, is comparable to or greater than the period of the write clock.

When a burst of transitions is written by high-data-rate writing, that is, a series of two or more minimum-spaced transitions is written, the head lacks sufficient time to reach a steady state during a single write-clock period. Thus, the state of the head at the start of each transition in a burst (after the first transition) is different than for isolated transitions (i.e., transitions that are not part of a burst). As a consequence of the potentially different initial states of the head for a burst of transitions, the time needed for reaching writing conditions differs for each transition in the burst, thus leading to improper transition placement.

A method is needed for write precompensating transitions for high-data-rate recording to allow higher data rates and recording densities. It must be emphasized that the density-dependent transition shifts described earlier do not disappear. The high data rate transition shits occur in addition to any density-dependent shifts and, in many cases, can exceed them in magnitude, making their treatment of secondary importance.

SUMMARY OF THE INVENTION

The present invention provides a write-precompensation technique for high-data-rate recording of magnetic transitions on a magnetic medium. The present invention reduces the readback soft-error rate at high data rates, thus allowing higher data rates and recording densities.

There are four general features of the write-precompensation method of the present invention:

(1) The transitions at the beginning of each burst are precompensated so that the times between successive transitions are larger than the write clock and larger than would be dictated by NLTS considerations alone.

(2) The transitions at the end of bursts are precompensated so that the times between successive transitions are larger than the write clock and larger than would be dictated by NLTS considerations alone.

(3) The isolated transitions are all delayed to provide recentering of the bursts.

(4) The transitions in the middle of each burst are optionally precompensated so that the time between at least two middle burst transitions are less than the write clock in order to shorten the overall time needed to write the burst.

The advantages of the present invention are provided by a method of write-precompensating a magnetization pattern that is to be recorded on a magnetic disk. According to the invention, at high data rates most of the recording difficulties occur when writing bursts of closest-spaced transitions because isolated transitions have more time preceding and following the isolated transitions for the head field to reach a sufficiently steady state. Also, as previously described for PR, EPR, $E^2$PR and similar detection methods, nonzero sampled equalized waveform values are only obtained near the beginning and the end of bursts. Otherwise, the sampled values of the equalized burst-waveform should be zero. Accordingly, the recording of data is improved if the time between successive transitions at the beginning of a burst and at the end of a burst is increased by using write precompensation to allow the head field more time to reach steady state between transitions. For PR detection, the timing of the second transition of a burst relative to the first transition of the burst must be increased and the timing of the nth transition relative to the $(n-1)^{th}$ transition of an n-transition burst must be increased. For EPR detection, in addition to the timing increases applied for PR detection, the timing of the third transition of a burst relative to the second transition must be increased and the timing of the $(n-1)^{th}$ transition relative to the $(n-2)^{th}$ transition must be increased. Similarly, for $E^2$PR detection, in addition to the timing increases applied for EPR detection, the timing of the fourth transition of a burst relative to the third transition must be increased and the timing of the $(n-2)^{th}$ transition relative to the $(n-3)^{th}$ transition must be increased.

The timing delays imparted to the various transitions of a burst to increase their separation in time from their respective preceding transitions can result in a cumulative lengthening of the burst, i.e., the $n^{th}$ transition of a burst may have a large cumulative delay relative to the first transition of the burst in order to accommodate the slow head-field rise time relative to the write clock. To reduce the effect of the cumulative delay, the isolated transitions in the written magnetization pattern can be delayed with write precompensation by approximately one-half the cumulative delay of the $n^{th}$ transition of a burst relative to the first transition of a burst. Delaying the isolated transitions in this manner serves to approximately equally divide the cumulative time delay of a burst between the beginning and the end of a burst. In other words, the bursts are recentered on a sequence of write clocks, centered on the isolated transitions, with the beginning of bursts occurring slightly early and the end of bursts occurring slightly late.

It can also be appreciated that the recording of a burst can be improved by using precompensation of the transitions in the middle of a burst to reduce the cumulative time delay of the end of a burst relative to the beginning of a burst. The precompensation of the middle transitions of a burst is done so that at least two of the transitions have a timing separation slightly less than one write clock. In this manner, the cumulative time delay of the last transition of a burst relative to the first transition of a burst can be reduced.

BRIEF DESCRIPTION OF THE DRAWING

The present invention is illustrated by way of example and not limitation in the accompanying figures in which like reference numerals indicate similar elements and in which.

DETAILED DESCRIPTION

High-data-rate recording depends heavily on the time between successive transitions, whereas precompensation is a time delay applied to a specific transition.

Because the precompensation method of the present invention must be applied to bursts of any length and because the precompensation differs depending on the detection scheme, whether PR, EPR, E²PR, etc., application of the precompensation according to the present invention to PR (Partial Response) detection will be discussed first.

If no precompensation were applied to a written data pattern, each transition would be written to coincide with a tick of a write clock having a period T. It can be assumed, without loss of generality, that write precompensation applied to a transition is always a delay of the transition relative to its associated write clock by noting that adding a constant precompensation delay to all transitions in a data pattern constitutes only an overall delay of the data pattern, not a change in its precompensation. Consequently, it will be assumed herein that the data transition having the least (most negative) delay relative to its associated write clock tick will define zero precompensation delay.

Precompensation for PR Detection

The precompensation of bursts of four transitions (tetrabits) is presented first because a burst of four transitions is the shortest burst in which all four of the features of the present invention described in the "Summary of the Invention" section apply. Longer bursts use a simple extension of this scheme and shorter bursts use an abbreviation of this scheme, as will be described below.

Figure 2:
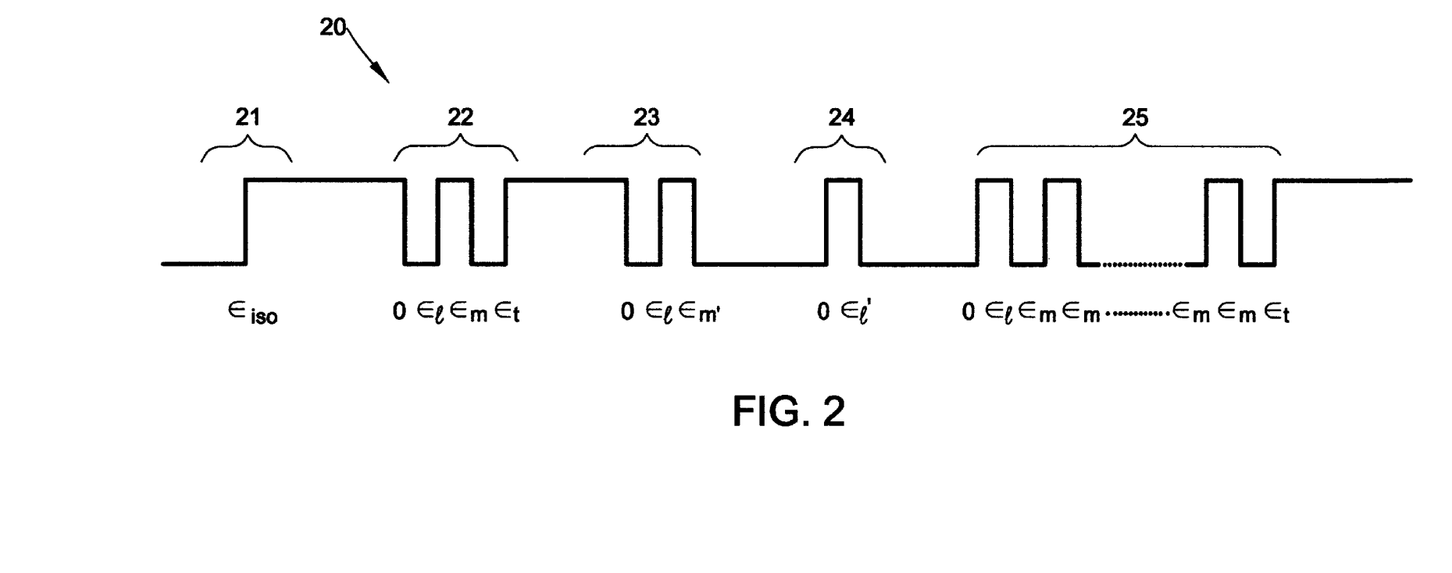
FIG. 2 shows an exemplary write-magnetization pattern having several types of transitions together with the precompensation delays that would be applied to each for PR readback according to the present invention.

FIG. 2 shows a magnetization pattern 20 containing an isolated transition 21, a tetrabit 22, a tribit 23, a dibit 24 and a burst of more than four transitions 25. Also shown in FIG. 2 are the precompensation values that are to be applied to each transition. Isolated transitions have a precompensation delay $\epsilon_{iso}>0$ applied. As stated earlier, this delay serves to recenter the bursts relative to their detection timing window for better sampling and detection.

The tetrabit 22 has no precompensation applied to its first transition. The second transition of the tetrabit has a precompensation delay $\epsilon_l>0$ (subscript l for "leading") applied. This delay ensures that the first two transitions are written sufficiently far enough apart in time for the head to write a good first transition and a good second transition so that on readback a single ±1 sample value is read. The third transition of the tetrabit has a precompensation delayey $\epsilon_m>0$ (subscript m for "middle") applied. This delay ensures that the first two transitions and the last two transitions are not so far apart that the overall tetrabit is too long to be read back well. Typically, $\epsilon_m<\epsilon_l$, so that the time interval between the writing of the second and third transitions, $T+\epsilon_m-\epsilon_l$, is less than T, the write-clock period. The fourth transition has a precompensation delay $\epsilon_t>\epsilon_m$ (subscript t for "trailing") applied. This relationship ensures that the time interval between the writing of the third and fourth transitions, $T+\epsilon_t-\epsilon_m$, is more than T so that on readback a single good ±1 sample value is read.

It should be noted that the condition $\epsilon_t>\epsilon_m\geq 0$ ensures that the precompensation scheme for a tetrabit written at a high data rate differs from a precompensation scheme for second-order NLTS (very high density) correction, involving $\epsilon_1$ and $\epsilon_2$, which would precompensate the four transitions of a tetrabit with delays 0, $\epsilon_1$, $\epsilon_1-\epsilon_2$ and $\epsilon_1-\epsilon_2$, respectively, with the physically necessary condition that $\epsilon_1>\epsilon_2$. Although the conditions $\epsilon_m<\epsilon_l$ and $\epsilon_t>\epsilon_m$ could, for some values of $\epsilon_l$, $\epsilon_m$ and $\epsilon_t$, be construed as similar to a third-order NLTS (extremely high density) correction, the high-data-rate precompensation scheme of the present invention differs both in its treatment of isolated transitions and in its treatment of longer bursts, as described below.

FIG. 2 also shows the precompensation for a tribit 23. The first transition has no precompensation applied. The second transition has a precompensation delay of $\epsilon_l$ applied, as for the tetrabit. The third transition has a precompensation delay of $\epsilon_{m'}\geq 0$ applied. The third-transition delay can take on any value from 0 through max($\epsilon_l$, $\epsilon_t$), although for simplicity of implementation, a value of $\epsilon_m$ (treating the transition the same as the third transition of a longer burst) or $\epsilon_t$ (treating the transition the same as the last transition of a longer burst) would be appropriate. In practice, setting $\epsilon_{m'}=\epsilon_m$ often provides good results.

FIG. 2 also shows the precompensation for a dibit 24. The first transition has no precompensation applied. The second transition has a precompensation delay of $\epsilon_{l'}>0$ applied. This second-transition delay, like the last transition of a tribit, can take on any value between 0 and max($\epsilon_l$, $\epsilon_t$). Again, for simplicity of implementation, a value of $\epsilon_l$ (treating the transition the same as the second transition of a longer burst) or $\epsilon_t$ (treating the transition the same as the last transition of a longer burst) would be appropriate. In practice, setting $\epsilon_{l'}=\epsilon_l$ often provides good results.

FIG. 2 also shows the precompensation for a burst 25 having n>4 transitions. The first transition has no precompensation applied. The second transition has a precompensation delay of $\epsilon_l>0$ applied. The third through $(n-1)^{th}$ transitions have a precompensation delay of $\epsilon_m$ applied, and the $n^{th}$ transition has a precompensation delay of $\epsilon_t$ applied.

It should be noted that the condition $\epsilon_t>\epsilon_m>0$ ensures that the precompensation scheme for a burst written at high data rate differs from any $p^{th}$-order NLTS (very high density) precompensation scheme involving $\epsilon_1, \epsilon_2, \ldots, \epsilon_p$ ($\epsilon_k$ is the temporal shift of a transition being written due to the demagnetization field of a transition that was written k write clocks earlier in time). Such NLTS precompensation would precompensate the successive transitions of the burst with delays 0, $\epsilon_1$, $\epsilon_1-\epsilon_2$, $\epsilon_1-\epsilon_2+\epsilon_3$, etc., and in general would apply to the $j^{th}$ transition of a burst of length n a precompensation delay of 0 for j=1, a precompensation delay of $$\sum_{k=2}^{j}(-1)^k\epsilon_{k-1}$$

for $1\leq j<p$, and a precompensation delay of $$\sum_{k=2}^{p+1}(-1)^k\epsilon_{k-1}$$

for j>p, with the physically necessary condition that $\epsilon_k>\epsilon_{k+1}$ for all k>0.

Figure 3:
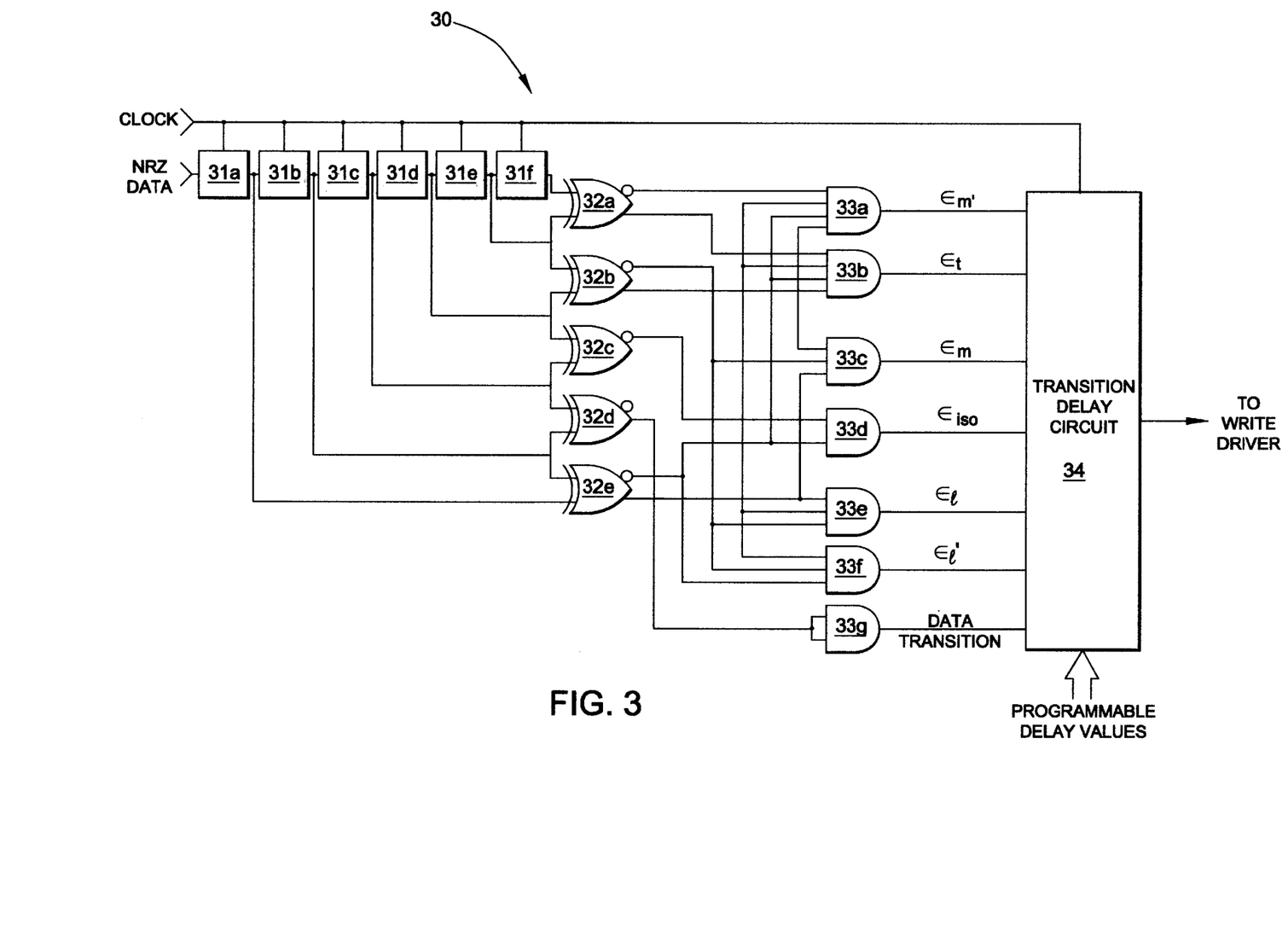
FIG. 3 shows a schematic block diagram of an exemplary configuration of a circuit for performing write precompensation for NRZ data for PR readback, according to the present invention.

FIG. 3 shows a schematic block diagram of a circuit 30 for determining write precompensation, according to the present invention, for NRZ data that is to be read back by a PR detection scheme. The specific configuration of circuit 30 in FIG. 3 includes six clocked latches 31a–31f constituting a shift register 31, five Exclusive-OR (EOR) gates 32a–32e, seven AND gates 33a–33g, and a programmable transition-delay circuit 34. An NRZ data pattern is clocked into the shift register 31. The respective outputs of the latches 31a–31f are applied to the EOR gates 32a–32e so that the respective outputs of two sequential latches are input to each EOR gate. EOR gates 32a–32e transform NRZ data input to circuit 30 into NRZI data, in which a "1" indicates a "transition", i.e., there is to be a reversal of the medium magnetization. The output of EOR gate 32d specifically indicates whether a transition is about to be written on the current write-clock tick. Similarly, the output of EOR gate 32c indicates whether a transition was written on the immediately preceding write-clock tick, the output of EOR gate 32e indicates whether a transition will be written on the immediately following write-clock tick, and so on. The outputs of EOR gates 32a–32e are applied in combination to AND gates 33a–33g. The AND gates are configured for determining the types of transitions in the input data pattern and generating an $\epsilon_{m'}$ signal, an $\epsilon_t$ signal, an $\epsilon_m$ signal, an $\epsilon_{iso}$ signal, an $\epsilon_l$ signal, an $\epsilon_{1'}$ signal, and a DATA TRANSITION signal. Each of the signals generated by AND gates 33a–33g is input to the transition delay circuit 34. Transition delay circuit 34 is programmed with selected write-precompensation delay times in a well-known manner. The $\epsilon_{m'}$, $\epsilon_t$, $\epsilon_m$, $\epsilon_{iso}$, $\epsilon_l$, and $\epsilon_{l'}$ p signals are used by transition delay circuit 34 to select precompensation delay times and to generate a pattern of properly delayed transitions at its output that are passed to a write-driver circuit (not shown) for recording on the storage medium.

The DATA TRANSITION signal applied to transition delay circuit 34 is true (high) for all transitions, regardless of type. When one of the other six delay signals generated by AND gates 33a–33f is also high, then a transition is presented at the output of transition delay circuit 34 that is delayed by the corresponding programmed amount relative to the write clock. Otherwise, a transition that is not delayed is presented at the output of transition delay circuit 34. Specifically, circuit 30 generates a transition delayed by $\epsilon_{m'}$ when both the $\epsilon_{m'}$ signal and the DATA TRANSITION signal are true. A transition delayed by $\epsilon_t$ is generated when both the $\epsilon_t$ signal and the DATA TRANSMON signal are true. A transition delayed by $\epsilon_m$ is generated when both the $\epsilon_m$ signal and the DATA TRANSION signal are true. A transition delayed by $\epsilon_{iso}$ is generated when both the $\epsilon_{iso}$ signal and the DATA TRANSITION signal are true. A transition delayed by $\epsilon_l$ is generated when both the $\epsilon_l$ signal and the DATA TRANSITION signal are true. Lastly, a transition delayed by $\epsilon_{l'}$ is generated when both the $\epsilon_{l'}$ signal and the DATA TRANSITION signal are true. When there is no transition in the input NRZ data stream, as detected by EOR gate 32d, then no transition is generated at the output of transition delay circuit 34.

The six NRZ bits shifted serially through shift register 31a–31f are sufficient to identify any bit pattern with a separate precompensation delay for PR readback according to the present invention. If the present invention is used with NRZI data, in which 1s represent transitions, the data is clocked into a five-bit shift register 31, EOR gates 32 are omitted and the NRZI data values and their appropriate complements are applied directly to the inputs of AND gates 33.

Table 1 sets forth, as an example, measured performance data for the write-precompensation technique of the present invention when bursts of transitions for encoded pseudorandom data are precompensated for a high data rate. A PR4 detection scheme was used, all writing was done at constant transition density on the disk and all reading was done at a user data rate of 15 MB/s.

TABLE 1

| Write Data | Maximum Precomp Value | | On-Track Error Rate | Error Magnetization Pattern |
|---|---|---|---|---|
| Rate (MB/s) | (ns) | (% of clock) | | (>99% of Errors) |
| Optimize NLTS $\epsilon_1$ | 15 | 0.32 | 4 | $<1 \times 10^{-10}$ | — |
| Incr. Data Rate | 30 | 0.32 | 9 | $9.2 \times 10^{-4}$ | ...0010... or ...1101... |
| Also apply $\epsilon_1$ | 30 | 0.80 | 22 | $7.9 \times 10^{-7}$ | ...10100... or ...01011... |
| Also apply $\epsilon_1$ | 30 | 1.04 | 28 | $<1 \times 10^{-10}$ | — |

Row 1 of Table 1 shows results for write precompensation for first-order NLTS effects at a user data rate of 15 MB/s. Setting $\epsilon_1$=0.32 ns yielded an error rate of 0 errors in $2\times10^{10}$ examined bits. Row 2 shows results when the write data rate was increased to 30 MB/s keeping $\epsilon_1$=0.32 ns. Under the conditions of row 2, the error rate significantly increased to 9.2×10–4, or 9.2 million errors in $10^{10}$ examined bits, because of poor writing of two transitions separated by one clock after at least one write clock period of no transitions. Over 99% of the errors occurring under the conditions of row 2 had a magnetization pattern of 0010 or 1101, which includes all dibits and the beginning of all longer bursts.

Row 3 of Table 1 shows results for a first exemplary write precompensation according to the present invention, which was to set $\epsilon_l=\epsilon_{l'}=\epsilon_m=\epsilon_{m'}=\epsilon_t$=0.80 ns of precompensation delay, i.e., to apply an additional 0.48 ns of delay to the second and subsequent transitions of bursts to the 0.32 ns called for by NLTS correction. The error rate for the conditions of row 3 was lowered substantially to $7.9\times10^{-7}$, or 7900 errors in $10^{10}$ examined bits. Under the conditions of row 3, the transitions receiving additional precompensation are the same as for $\epsilon_1$- only NLTS precompensation. While the NLTS was compensated for at a low data rate, the additional delay added by the present invention compensates for field risetime effects at higher write data rates by allowing more time for the head field to exceed the medium coercivity $H_c$ and to stabilize before being switched to write the second transition of each burst. After the first exemplary precompensation of the present invention was applied to the encoded pseudorandom data, over 99% of the remaining errors occurred at the end of strings of closest-spaced transitions (bursts).

Row 4 of Table 1 shows results for a second exemplary precompensation according to the present invention, which was to set $\epsilon_l=\epsilon_{l'}=\epsilon_m$=0.80 ns and $\epsilon_{m'}=\epsilon_t$=1.04 ns, i.e., to apply an additional 0.24 ns of delay to the final transition of all bursts with more than two transitions. Thus, the initial transition in a burst has no delay, intermediate transitions and the second transition of dibits have 0.80 ns delay, and the final transition in all bursts longer than dibits have 1.04 ns delay with respect to the write clock. Under the conditions of Row 4, the error rate was reduced again to 0 errors in $2\times10^{10}$ examined bits.

Because the application of additional precompensation to the leading and trailing transitions of bursts, as described above, resulted in a negligibly low error rate, no precompensation of isolated transitions to recenter the bursts or of the middle transitions of bursts to shorten them was attempted.

Table 2 sets forth, as a second example, measured performance data for the write-precompensation technique of the present invention for MTR-encoded pseudorandom data are precompensated for a high data rate. Because the MTR-encoded data used has a dibit as its longest burst, only the effects of $\epsilon_l > \epsilon_1$ ($\epsilon_1$ is the optimized NLTS precompensation at low data rate) and of $\epsilon_{iso}$ can be illustrated by this example. A PR4 detection scheme was used, all writing was done at constant transition density on the disk, and all reading was done at a user data rate of 15 MB/s.

TABLE 2

| | Write Data Rate (MB/s) | Maximum Precomp Value (ns) | Maximum Precomp Value (% of clock) | On-Track Error Rate |
|---|---|---|---|---|
| Optimize NLTS $\epsilon_1$ | 15 | 0.24 | 5 | $<1 \times 10^{-10}$ |
| Incr. data rate and optimize $\epsilon_1$ | 46 | 0.80 | 37 | $7.7 \times 10^{-5}$ |
| Also apply $\epsilon_{iso}$ | 46 | 0.88 | 40 | $<1 \times 10^{-10}$ |

Row 1 of Table 2 shows results for write precompensation for first-order NLTS effects at a user data rate of 15 MB/s. Setting $\epsilon_1 = 0.24$ ns yielded an error rate of 0 errors in $2 \times 10^{10}$ examined bits. This value of $\epsilon_1$ was optimal as measured by dibit extraction techniques. Row 2 shows results when the write data rate was increased to 46 MB/s and $\epsilon_1$ was optimized to 0.80 ns, while keeping the readback data rate at 15 MB/s. Under the conditions of row 2, the error rate significantly increased to $7.7 \times 10^{-5}$, or 770 thousand errors in $10^{10}$ examined bits, because the dibits, although well written, were not well centered in time relative to the isolated transitions. Row 3 shows results when $\epsilon_{iso} = 0.44$ ns was applied to the isolated transitions and $\epsilon_1$ was adjusted slightly to 0.88 ns. Under the conditions of row 3 the error rate was again reduced to 0 errors in $2 \times 10^{10}$ examined bits, demonstrating the utility of centering bursts at high data rates by using $\epsilon_{iso}$ to shift the isolated transitions.

Precompensation for EPR Detection

As described earlier, for EPR detection an isolated transition gives rise to three nonzero samples of the equalized readback waveform and a burst of length n gives rise to two nonzero samples at the beginning two nonzero samples at the end, and n−2 zero samples in the middle of the burst. To ensure good sample values at the beginning and end of the burst on readback, EPR write precompensation for high data rates must ensure that the first three and the last three transitions of a burst are well spaced in time.

Figures 4A, 4B:
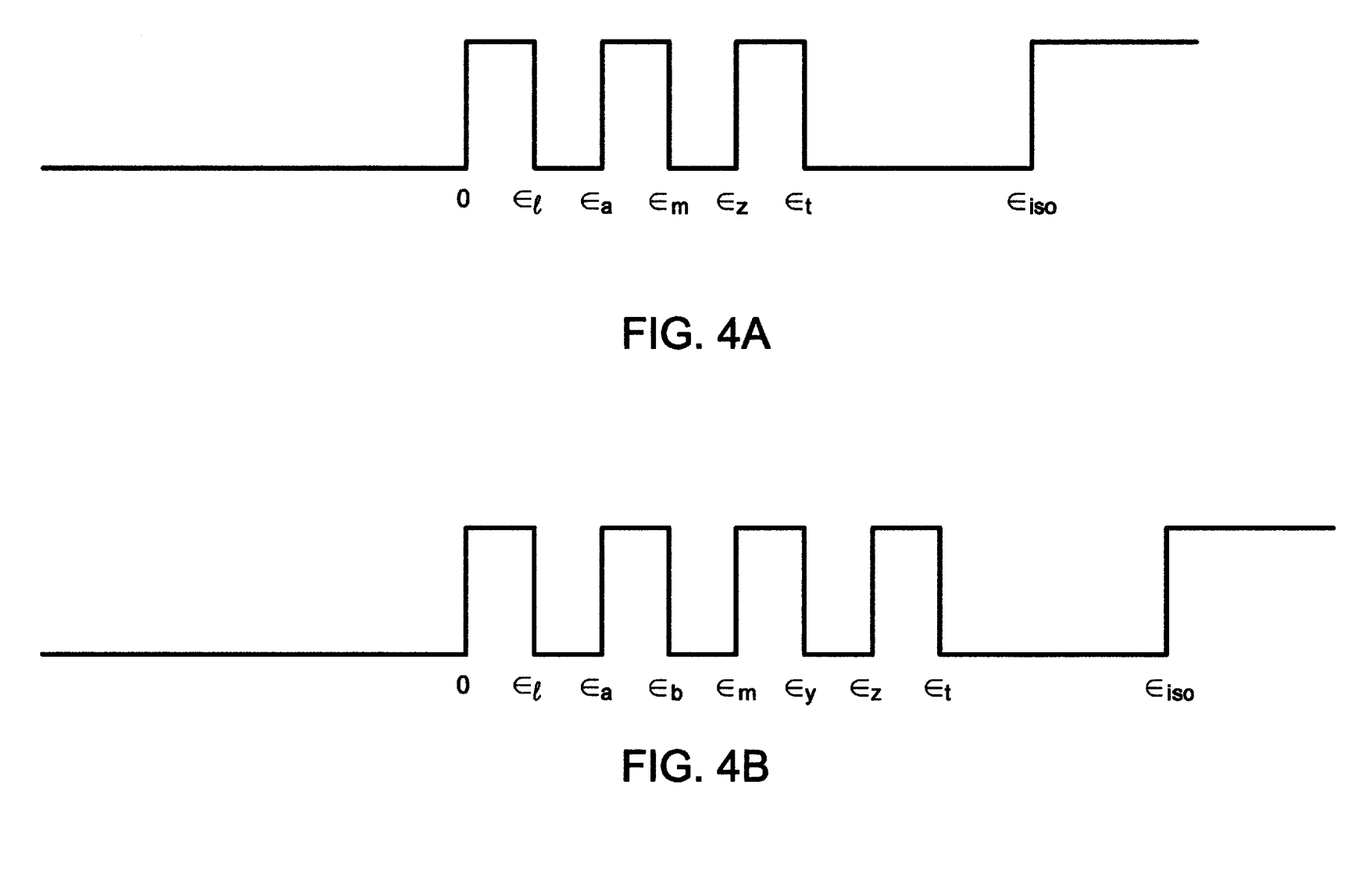
FIG. 4a shows an exemplary write-magnetization pattern having a burst of six transitions and an isolated transition together with the precompensation delays that would be applied to each for EPR readback according to the present invention.
FIG. 4b shows an exemplary write-magnetization pattern having a burst of eight transitions and an isolated transition together with the precompensation delays that would be applied to each for $E^2$PR readback according to the present invention.

FIG. 4a shows a magnetization pattern consisting of a burst of six transitions and an isolated transition, with write-precompensation delay values to be applied to each transition. In a manner analogous to that described for PR detection, the first transition of the burst receives no pre-compensation delay, the second transition of the burst receives a precompensation delay of $\epsilon_l > 0$, and the third transition of the burst receives a new precompensation delay of $\epsilon_a \geq 0$ to properly space the transitions at the beginning of the burst to ensure two good detected equalized samples. Also analogously, the middle transitions of the burst receive a precompensation delay of $\epsilon_m \leq \epsilon_a$, the penultimate transition of the burst receives a new precompensation delay of $\epsilon_z \geq \epsilon_m$, and the last transition of the burst receives a precompensation delay of $\epsilon_l > \epsilon_z$ in order to shorten the overall burst length and to properly space the transitions at the end of the burst to ensure two good detected samples. Finally, isolated transitions receive a precompensation delay of $\epsilon_{iso} > 0$ in order to recenter the bursts of the magnetization pattern in the detection timing window. Also in analogy with PR detection, bursts with more than six transitions are handled by applying $\epsilon_m$ precompensation delay to the transitions in the middle of the burst. Similarly, bursts with fewer than six transitions are precompensated by selective deletion of the corresponding long-burst precompensation delays.

Precompensation for E²PR Detection

As described earlier, for E²PR detection an isolated transition gives rise to four nonzero samples of the equalized readback waveform and a burst of length n gives rise to three nonzero samples at the beginning, three nonzero samples at the end, and n−3 zero samples in the middle of the burst. To ensure good sample values at the beginning and end of the burst on readback, E²PR write precompensation for high data rates must ensure that the first four and the last four transitions of a burst are well spaced in time.

FIG. 4b shows a magnetization pattern consisting of a burst of eight transitions and an isolated transition, with write-precompensation delay values to be applied to each transition. In a manner analogous to that described for EPR detection, the first transition of the burst receives no pre-compensation delay, the second transition of the burst receives a precompensation delay of $\epsilon_l > 0$, the third transition of the burst receives a precompensation delay of $\epsilon_a > 0$, and the fourth transition of the burst receives a new precompensation delay of $\epsilon_b \geq 0$ to properly space the transitions at the beginning of the burst to ensure three good detected equalized samples. Also analogously, the middle transitions of the burst receive a precompensation delay of $\epsilon_m \leq \epsilon_b$, the ante-penultimate transition of the burst receives a new precompensation delay of $\epsilon_y \geq \epsilon_m$, the penultimate transition of the burst receives a precompensation delay of $\epsilon_z \geq \epsilon_y$, and the last transition of the burst receives a precompensation delay of $\epsilon_l > \epsilon_z$ in order to shorten the overall burst length and to properly space the transitions at the end of the burst to ensure three good detected samples. Finally, isolated transitions receive a precompensation delay of $\epsilon_{iso} > 0$ in order to recenter the bursts of the magnetization pattern in the detection timing window. Also in analogy with PR detection, bursts with more than eight transitions are handled by applying $\epsilon_m$ precompensation to the transitions in the middle of the burst. Similarly, bursts with fewer than eight transitions are precompensated by selective deletion of the corresponding long-burst precompensation delays.

While the present invention has been described in connection with the illustrated embodiments, it will be appreciated and understood that modifications may be made without departing from the true spirit and scope of the invention.

What is claimed is:

1. A method for write-precompensating a waveform for magnetically recording the waveform on a magnetic medium, the method comprising steps of:

applying a first predetermined write-precompensation delay $\epsilon_l$ to a second transition of a burst of transitions of the waveform, the burst of transitions having at least four transitions, the second transition being immediately subsequent to a first transition of the burst of transitions, each transition of the burst corresponding to a tick of a write clock having a period T, the first predetermined write-precompensation delay $\epsilon_l$ delaying the second transition of the burst of transitions with respect to the tick of the write clock corresponding to the second transition;

applying a second predetermined write-precompensation delay $\epsilon_t$ to a last transition of the burst, the second predetermined write-precompensation delay $\epsilon_t$ delaying the last transition of the burst with respect to the tick of the write clock corresponding to the last transition; and applying a third predetermined write-precompensation delay $\epsilon_m$ to all transitions of the burst of transitions that are subsequent to the second transition except the last transition of the burst, the third predetermined write-precompensation delay $\epsilon_m$ delaying each transition of the burst that is subsequent to the second transition with respect to a tick of the write clock corresponding to the transition.

2. The method according to claim 1, wherein $\epsilon_m > 0$.
3. The method according to claim 2, wherein $\epsilon_m \ll \epsilon_l$.
4. The method according to claim 2, wherein $\epsilon_m \ll \epsilon_t$.
5. The method according to claim 1, wherein the waveform further includes an isolated transition, the method further comprising a step of applying a fourth predetermined write-precompensation delay $\epsilon_{iso}$ to the isolated transition, the fourth predetermined write-precompensation delay $\epsilon_{iso}$ delaying the isolated transition with respect to a tick of the write clock corresponding to the isolated transition and recentering the burst relative a detection timing window.

6. The method according to claim 1, wherein the burst of transitions has at least six transitions, and wherein the step of applying the third predetermined write-precompensation delay $\epsilon_m$ applies the third predetermined write-precompensation delay $\epsilon_m$ to all transitions of the burst of transitions that are subsequent to a third transition of the burst of transitions except the penultimate and the last transition of the burst, the third transition being immediately subsequent to the second transition, the third predetermined write-precompensation delay $\epsilon_m$ delaying each transition of the burst that is subsequent to the third transition except the penultimate and the last transition with respect to a tick of the write clock corresponding to the transition the method further comprising steps of:

applying a fifth predetermined write-precompensation delay $\epsilon_a$ to the third transition of the burst of transitions, the fifth predetermined write-precompensation delay $\epsilon_a$ delaying the third transition of the burst of transitions with respect to the tick of the write clock corresponding to the third transition; and applying a sixth predetermined write-precompensation delay $\epsilon_z$ to the penultimate transition of the burst, the sixth predetermined write-precompensation delay $\epsilon_z$ delaying the penultimate transition of the burst with respect to the tick of the write clock corresponding to the penultimate transition.

7. The method according to claim 6, wherein $\epsilon_m > 0$.
8. The method according to claim 7, wherein $\epsilon_m \leq \epsilon_a$.
9. The method according to claim 7, wherein $\epsilon_m \leq \epsilon_z$.
10. The method according to claim 7, wherein $\epsilon_m < \epsilon_t$.
11. The method according to claim 6, wherein the burst of transitions has at least eight transitions, and wherein the step of applying the third predetermined write-precompensation delay $\epsilon_m$ applies the third predetermined write-precompensation delay $\epsilon_m$ to all transitions of the burst of transitions that are subsequent to a fourth transition of the burst of transitions except the antepenultimate, penultimate and the last transitions of the burst, the fourth transition being immediately subsequent to the third transition, the third predetermined write-precompensation delay $\epsilon_m$ delaying each transition of the burst that is subsequent to the fourth transition with respect to a tick of the write clock corresponding to the transition, the method further comprising steps of:

applying a seventh predetermined write-precompensation delay $\epsilon_b$ to the fourth transition of the burst of transitions, the seventh predetermined write-precompensation delay $\epsilon_b$ delaying the fourth transition of the burst of transitions with respect to the tick of the write clock corresponding to the fourth transition; and applying an eighth predetermined write-precompensation delay $\epsilon_y$ to the antepenultimate transition of the burst, the eighth predetermined write-precompensation delay $\epsilon_y$ delaying the antepenultimate transition of the burst with respect to the tick of the write clock corresponding to the antepenultimate transition.

12. The method according to claim 11, wherein $\epsilon_m > 0$.
13. The method according to claim 12, wherein $\epsilon_m \leq \epsilon_b$.
14. The method according to claim 12, wherein $\epsilon_m \leq \epsilon_y$.
15. The method according to claim 12, wherein $\epsilon_m \leq \epsilon_z$.
16. The method according to claim 12, wherein $\epsilon_m < \epsilon_t$.
17. The method according to claim 1, wherein the waveform further includes a dibit, the method further comprising a step of applying a ninth predetermined write-precompensation delay $\epsilon_{l'}$ to a second transition of the dibit with respect to the tick of the write clock corresponding to the second transition of the dibit.

18. The method according to claim 17, wherein $\epsilon_{l'} = \epsilon_l$.
19. The method according to claim 1, wherein the waveform further includes a tribit, the method further comprising a step of applying a tenth predetermined write-precompensation delay $\epsilon_{m'}$ to a third transition of the tribit, wherein $0 \leq \epsilon_{m'} \leq \max(\epsilon_l, \epsilon_t)$.

20. A device for write-precompensating a waveform for magnetically recording the waveform on a magnetic medium, the device comprising:

a shift register receiving the waveform, the waveform having a plurality of transitions;

a pattern detector detecting a predetermined pattern of transitions of the waveform; and a delay device generating a first predetermined write-precompensation delay $\epsilon_l$ for a second transition of a burst of transitions of the waveform, the burst of transitions having at least four transitions, the second transition being immediately subsequent to a first transition of the burst of transitions, each transition of the burst corresponding to a tick of a write clock having a period T, the first predetermined write-precompensation delay $\epsilon_l$ delaying the second transition of the burst of transitions with respect to the tick of the write clock corresponding to the second transition, generating a second predetermined write-precompensation delay $\epsilon_t$ for a last transition of the burst, the second predetermined write-precompensation delay $\epsilon_t$ delaying the last transition of the burst with respect to the tick of the write clock corresponding to the last transition, and generating a third predetermined write-precompensation delay $\epsilon_m$ for all transitions of the burst of transitions that are subsequent to the second transition except the last transition of the burst, the third predetermined write-precompensation delay $\epsilon_m$ delaying each transition of the burst that is subsequent to the second transition with respect to a tick of the write clock corresponding to the transition.

21. The device according to claim 20, wherein $\epsilon_m \geq 0$.

22. The device according to claim 21, wherein $\epsilon_m < \epsilon_l$.

23. The device according to claim 21, wherein $\epsilon_m < \epsilon_t$.

24. The device according to claim 20, wherein the waveform further includes an isolated transition, the delay device generating a fourth predetermined write-precompensation delay $\epsilon_{iso}$ to the isolated transition, the fourth predetermined write-precompensation delay $\epsilon_{iso}$ delaying the isolated transition with respect to a tick of the write clock corresponding to the isolated transition and recentering the burst relative a detection timing window.

25. The device according to claim 20, wherein the burst of transitions has at least six transitions, wherein the delay device generates the third predetermined write-precompensation delay $\epsilon_m$ for all transitions of the burst of transitions that are subsequent to a third transition of the burst of transitions except the penultimate and the last transition of the burst, the third transition being immediately subsequent to the second transition, the third predetermined write-precompensation delay $\epsilon_m$ delaying each transition of the burst that is subsequent to the third transition except the penultimate and the last transition with respect to a tick of the write clock corresponding to the transition, and wherein the delay device generates a fifth predetermined write-precompensation delay $\epsilon_a$ for the third transition of the burst of transitions, the fifth predetermined write-precompensation delay $\epsilon_a$ delaying the third transition of the burst of transitions with respect to the tick of the write clock corresponding to the third transition, and generates a sixth predetermined write-precompensation delay $\epsilon_z$ for the penultimate transition of the burst, the sixth predetermined write-precompensation delay $\epsilon_z$ delaying the penultimate transition of the burst with respect to the tick of the write clock corresponding to the penultimate transition.

26. The device according to claim 25, wherein $\epsilon_m \geq 0$.

27. The device according to claim 26, wherein $\epsilon_m \leq \epsilon_a$.

28. The device according to claim 26, wherein $\epsilon_m \leq \epsilon_z$.

29. The device according to claim 26, wherein $\epsilon_m < \epsilon_t$.

30. The device according to claim 25, wherein the burst of transitions has at least eight transitions, wherein the delay device generates the third predetermined write-precompensation delay $\epsilon_m$ for all transitions of the burst of transitions that are subsequent to a fourth transition of the burst of transitions except the antepenultimate, penultimate and the last transitions of the burst, the fourth transition being immediately subsequent to the third transition, the third predetermined write-precompensation delay $\epsilon_m$ delaying each transition of the burst that is subsequent to the fourth transition with respect to a tick of the write clock corresponding to the transition, and wherein the delay device generates a seventh predetermined write-precompensation delay $\epsilon_b$ for the fourth transition of the burst of transitions, the seventh predetermined write-precompensation delay $\epsilon_b$ delaying the fourth transition of the burst of transitions with respect to the tick of the write clock corresponding to the fourth transition, and generates an eighth predetermined write-precompensation delay $\epsilon_y$ for a antepenultimate transition of the burst, the eighth predetermined write-precompensation delay $\epsilon_y$ delaying the antepenultimate transition of the burst with respect to the tick of the write clock corresponding to the antepenultimate transition.

31. The device according to claim 30, wherein $\epsilon_m \geq 0$.

32. The device according to claim 31, wherein $\epsilon_m \leq \epsilon_b$.

33. The device according to claim 31, wherein $\epsilon_m \leq \epsilon_y$.

34. The device according to claim 31, wherein $\epsilon_m \leq \epsilon_z$.

35. The device according to claim 31, wherein $\epsilon_m 21 \epsilon_t$.

36. The device according to claim 20, wherein the waveform further includes a dibit, and wherein the delay device generates a ninth predetermined write-precompensation delay $\epsilon_{l'}$ for a second transition of the dibit with respect to the tick of the write clock corresponding to the second transition of the dibit instead of generating the first predetermined write-precompensation delay $\epsilon_l$ and the second predetermined write-precompensation delay $\epsilon_t$.

37. The device according to claim 36, wherein $\epsilon_{l'} = \epsilon_l$.

38. The device according to claim 20, wherein the waveform further includes a tribit, wherein the delay device generates a tenth predetermined write-precompensation delay $\epsilon_{m'}$ for a third transition of the dibit instead of generating the method further comprising a step of replacing the step of applying the second predetermined write-precompensation delay $\epsilon_t$ to a third transition of the tribit, and wherein $0 \leq \epsilon_{m'} \leq \max(\epsilon_l, \epsilon_t)$.

* * * * *